(12) United States Patent  (10) Patent No.: US 6,607,310 B2
Kranz et al.  (45) Date of Patent: Aug. 19, 2003

(54) SHUTTER FOR A PHOTOGRAPHIC CAMERA

(75) Inventors: Gerhard Kranz, Wetzlar (DE); Christoph Knapp, Dornburg (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 09/929,366

(22) Filed: Aug. 15, 2001

(65) Prior Publication Data

US 2002/0025166 A1 Feb. 28, 2002

(30) Foreign Application Priority Data

Aug. 23, 2000 (DE) .......................... 100 41 254

(51) Int. Cl.⁷ .............................................. G03B 15/00
(52) U.S. Cl. ........................................................ 396/352
(58) Field of Search ................................ 396/480, 479, 396/478, 466, 465, 452

(56) References Cited

U.S. PATENT DOCUMENTS 3,498,195 A * 3/1970 Ono ............................ 396/251
3,670,636 A * 6/1972 Holle et al. ................. 396/251
3,724,351 A * 4/1973 Matsumoto ................. 355/276
4,205,910 A * 6/1980 Nakagawa et al. .......... 396/473
4,487,492 A * 12/1984 Toyoda et al. .............. 396/466

FOREIGN PATENT DOCUMENTS

DE  23 40 152 C3  7/1974
DE  32 15 267 A1  12/1983

* cited by examiner

Primary Examiner—Russell Adams
Assistant Examiner—D. Ben Esplin
(74) Attorney, Agent, or Firm—Foley & Lardner

(57) ABSTRACT

A shutter for a photographic camera, having a first and a second pretensioned shutter curtain which are respectively retained in the tensioned state by a first and a second pivotably mounted retaining latch (7, 11) in interaction with a first and second curtain latch (3, 4), the first retaining latch (7) being coupled to a camera release for enabling release of the first curtain, and the second retaining latch (11) being coupled to a release device, which is controlled as a function of the release of the first curtain, for enabling release of the second curtain, wherein the first and second retaining latches (7, 11) are respectively assigned first and second movement-releasing active surfaces (9, 10; 13, 14) which are each coupled either to a mechanically controlled or an electronically controlled curtain-release enabling arrangement.

11 Claims, 2 Drawing Sheets

SHUTTER FOR A PHOTOGRAPHIC CAMERA

The applicants hereby claim the benefit of priority of German Application No. 100 41 254.8, filed Aug. 23, 2000. The entire contents of this German application are incorporated herein by reference.

BACKGROUND

The invention relates to a shutter for a photographic camera, having a first and a second pretensioned shutter curtain which are respectively retained in the tensioned state by a first and a second pivotably mounted retaining latch in interaction with a first and second curtain latch, the first retaining latch being coupled to a camera release for enabling release of the first curtain, and the second retaining latch being coupled to a release device, which is controlled as a function of the release of the first curtain, for enabling release of the second curtain.

For the temporally controlled exposure of film, cameras have, in front of the plane of the film, a shutter which comprises two curtains moving temporally one after the other. The curtains can be formed by metal plates or rolling cloth screens. With the transport of a film into the exposure area, both curtains are tensioned via a spring mechanism and are retained in this state by a latch and lever mechanism. In the case of an electromechanical design, the curtains are retained by magnetically actuated latches.

Purely mechanical spring-tensioning and latch/lever mechanisms have the advantage that they are independent of an electric power supply and are operative over a large temperature range. However, the mechanical requirements and the outlay on components for the timing between the start of the first shutter curtain and the start of the second shutter curtain are considerable, particularly for relatively short shutter times. For the release of the latches, high frictional forces have to be overcome. When the second shutter curtain is released through the movement of the first curtain, the latter is briefly retarded, with the result that the times formed become imprecise. In the case of very short shutter times, this leads to difficulties in coordinating the mechanical elements and forces.

Retaining magnets for the shutter curtains have the advantage of permitting an electrically controlled first release and an electronic timing which is based on the latter. The movements of the two curtains can be controlled independently of each other. However, the high energy requirement of the retaining magnets is disadvantageous in some designs.

SUMMARY OF THE INVENTION

The invention is based on the object of making selective use of the advantages of both shutter releasing designs. In a camera having a purely mechanically controlled shutter release, the intention is to be able to use the existing mounting space for the mounting of solenoids to reduce the complexity of the components for a mechanical timer mechanism. The shutter release itself can be a common camera release.

In the case of a shutter of the type mentioned at the beginning, this object is achieved according to the invention in that the first and second retaining latches are respectively assigned first and second movement-releasing active surfaces which are each coupled either to a mechanically controlled or an electronically controlled curtain-release enabling arrangement. Advantageous refinements and developments are described below.

The curtain latches, which are under spring stress after the setting of the shutter are locked via a respective, pivotably mounted retaining latch. The retaining latches are respectively assigned active surfaces which are separated geometrically from each other and via which the locking of the latches can be selectively released. The active surfaces are advantageously provided directly on the retaining latches. The retaining latches can first of all be designed in a simple manner in terms of their size to provide vibrationproof locking of the curtain latches. They moreover form a lever whose length and shape can be selected independently thereof in such a manner that, in the event of an impact against one of the active surfaces with sufficient force, reliable release of the latch connection takes place.

One of the active surfaces in each case can be assigned to a purely mechanically controlled release of the latch, while the other active surface can be assigned to an electronically controlled release of the latch. The mechanically controlled release of the latch contains a mechanical chain of action at whose end an unlatching lever acts upon the assigned active surface on the first retaining latch by means of impact or pressure. The electronically controlled release of the other latch contains a solenoid having a dischargeable armature lever which can be pushed against the respectively other active surface. The mounting space required for these components is relatively small.

For the selective setting of the two release options an eccentric is provided with which the mechanical chain of action can be moved into the functional position or moved out of the functional position. The eccentric is expediently coupled in this case to a mode selector switch. In a position in which the eccentric brings the mechanical chain of action into a functional position, the power supply for the solenoids can be interrupted in a simple manner via the actuation of a switch, with the result that double releases are reliably avoided.

The eccentric also enables the mechanical chain of action to be moved into functional positions which are coupled to a mechanical timing assembly for the successive release of the latches. For this purpose, the curtain latch which is released first of all can be designed as a cam plate which, as a function of the particular position of a control lever for the curtain latch to be released subsequently, acts at an earlier or later point on said control lever. The accuracy of this setting of the shutter times is limited, but is entirely sufficient for standard times.

Pulsed magnets are advantageously provided as electrically activatable solenoids. Said pulsed magnets are distinguished in that their armature lever is retained in the currentless state by permanent magnets and the armature is discharged only when sufficient power is supplied. The load on the power source in the camera is therefore kept very small. However, it is disadvantageous that in the event of discharging of the armature released first and a subsequent disconnection of the power supply prior to the discharging of the armature to be released subsequently, the associated shutter curtain remains open. This would lead to faulty exposures. According to the invention, the on/off switch on the camera is therefore of two-stage design, so that prior to a disconnection of the power supply after power has been supplied to the first pulsed magnet, power is furthermore supplied to the second pulsed magnet.

For the precise release of pulsed magnets the design-specific value of the discharging current has to be built up as rapidly as possible. If precisely the voltage of the discharging current is applied to the magnet, then the buildup of current lasts too long on account of existing inductances. If, in contrast, a higher voltage is applied to the magnet, then the discharging current will be passed in a short time and then exceeded. As a result, the magnet builds up force again and the discharging of the armature is suppressed or becomes imprecise. According to the invention, a power supply is therefore selected which has a level profile which begins with a sharply rising signal level lying clearly above the customary discharging voltage and then drops rapidly to the design-specific discharging value.

BRIEF DESCRIPTION OF THE DRAWINGS

The invention is described below with reference to exemplary embodiments which are illustrated schematically in the drawings, in which.

DESCRIPTION OF PREFERRED EMBODIMENTS

Figure 1:
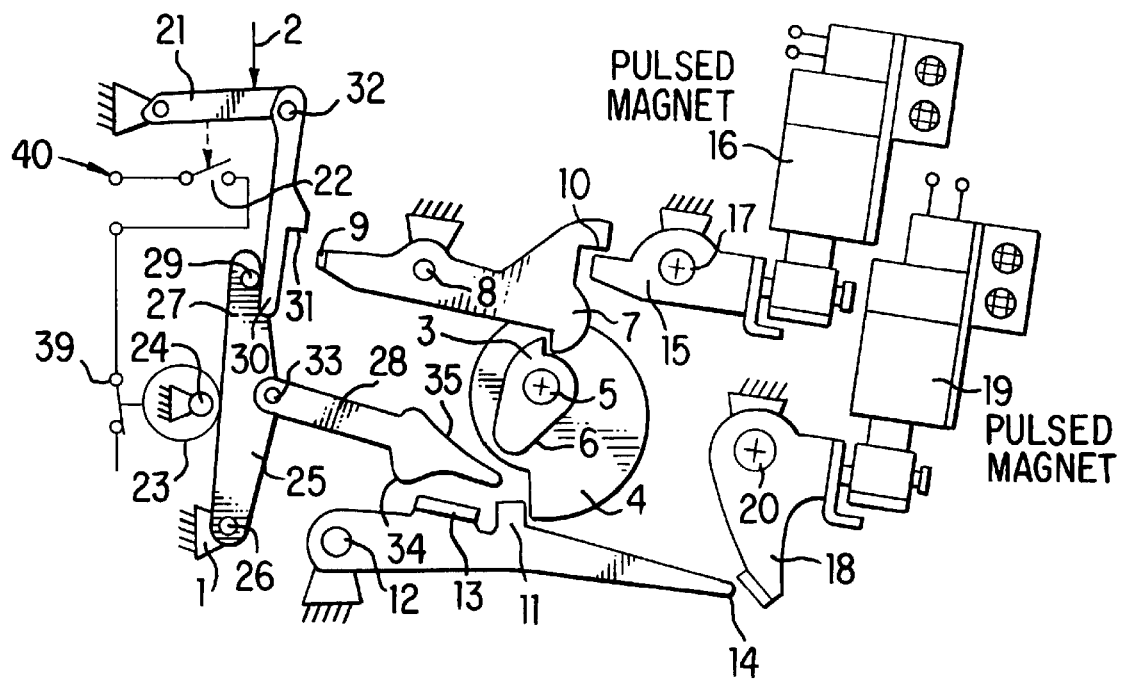
FIG. 1 shows the principle of the mechanically and electronically controlled chain of action of the latch release.

In FIG. 1, the rotational or pivot axes provided with a ground symbol 1 are fastened to the camera housing (not illustrated in greater detail). The camera release button which acts in the direction of the arrow 2 is likewise not illustrated.

The position shown in FIG. 1 of the mechanical chain of action for the latch release corresponds to the mode for an electronically controlled shutter release. First and second rolling screens are provided as the shutter curtains, said rolling screens lying below the first and second curtain latches 3 and 4 in the spring-stressed state. The curtain latches 3, 4 are connected to rolling-screen rollers which are arranged concentrically with respect to one another and of which only the rotational axis 5 of the first rolling screen can be seen.

The curtain latch 3 is designed as a cam plate 6 whose significance is described further below. The curtain latch 3 is in engagement with a first retaining latch 7 which is mounted such that it can pivot about a positionally fixed spindle 8. The retaining latch 7 is designed as a two-armed lever and has a first active surface 9 and a second active surface 10.

The curtain latch 4 which is connected to the second rolling screen is in engagement with a second retaining latch 11. The latter is mounted such that it can pivot about a positionally fixed spindle 12 and in the exemplary embodiment is designed as a one-armed lever. The retaining latch 11 likewise has a first active surface 13 and a second active surface 14.

The armature lever 15 of a first pulsed magnet 16 is arranged opposite the second active surface 10 of the first retaining latch 7. The armature lever 15 is mounted such that it can rotate about an axis 17. The armature lever 18 of a second pulsed magnet 19 is arranged opposite the second active surface 14 of the second retaining latch 11. The armature lever 18 is mounted such that it can rotate about an axis 20.

By moving a lever 21 coupled to the camera release button, a release contact 22 is closed. This leads via an electric line (not illustrated in greater detail here) to a brief supply of power to the first pulsed magnet 16 which then enables release of the armature lever 15. The armature lever 15, by rotation about its axis 17 in the clockwise direction and impact against the active surface 10, releases the latch connection between the first curtain latch 3 and the first retaining latch 7 and therefore enables the first shutter curtain to move. After a predetermined shutter time has elapsed, the pulsed magnet 19 is similarly supplied with power and then enables release of the armature lever 18. By rotation of the armature lever 18 about its axis 20 in the clockwise direction and impact against the active surface 14 of the second retaining latch 11, the latch connection to the second curtain latch 4 is also released here, with the result that the second shutter curtain can move.

The mechanical elements shown in the left-hand part of the figure are not operational in this position. In order to bring them into a functional position, an eccentric 23 is rotated about an axis 24. The eccentric 23 is coupled for this purpose to a mode selector switch 41 (not illustrated here) on the outer camera housing.

An adjusting lever 25 bears against the eccentric 23, the adjusting lever being mounted such that it can pivot about a positionally fixed spindle 26. The adjusting lever 25 is designed as a one-armed lever which forms a fixed, first control lever 27 and on which a second control lever 28 is articulated via a pin 33. The first control lever 27 has a pin 29 against which an unlatching lever 30 having an impact surface 31 bears. The unlatching lever 30 is mounted on the lever 21, which is actuated via the camera release button, in a manner such that it can pivot about an axis 32.

When the eccentric 23 is rotated, the adjusting lever 25 is pivoted in the clockwise direction about its axis 26 and in the process, via the pin 29, moves the unlatching lever 30, with the result that the impact surface 31 of the latter comes into an active position with respect to the first active surface 9 on the first retaining latch 7. In addition, the second control lever 28 is brought by its lug 34 into an active position with respect to the first active surface 13 on the retaining latch 11. At the head end, the control lever 28 also has a wedge-shaped region 35 which is simultaneously pushed in the process into an active position with respect to the cam plate 6 on the first curtain latch 3.

By movement of the lever 21, which is coupled to the camera release button, and of the unlatching lever 30 which is attached thereto, first of all the latch connection between the first curtain latch and the retaining latch 7 is released. During movement of the first shutter curtain, the cam plate 6 comes, in a certain angular position, into contact with the wedge-shaped region 35 on the second control lever 28 and presses its lug 34 against the first active surface 13 on the second retaining latch 11. As a result, the latch connection between the retaining latch 11 and the curtain latch 4 is also released, with the result that the second shutter curtain can move.

The time delay for releasing the second latch connection depends on the position of the wedge-shaped region 35 on the control lever 28 relative to the cam plate 6 on the first curtain latch 3. This position is determined by the rotational angle of the eccentric 23 which therefore enables preselection of the shutter times, the preselection being sufficiently precise particularly for selected standard times. The impact surface 31 on the unlatching lever 30 has to be selected to be sufficiently large so that even in different positions of the adjusting lever 25 there is a reliable action upon the retaining latch 7.

Coupled to the rotation of the eccentric 23 is a switch 39 which, when the adjusting lever 25 is pivoted in the mechanically controlled state of functional readiness, interrupts the line supplying power between the release contact 22 and the pulsed magnet 16, 19.

Figure 2:
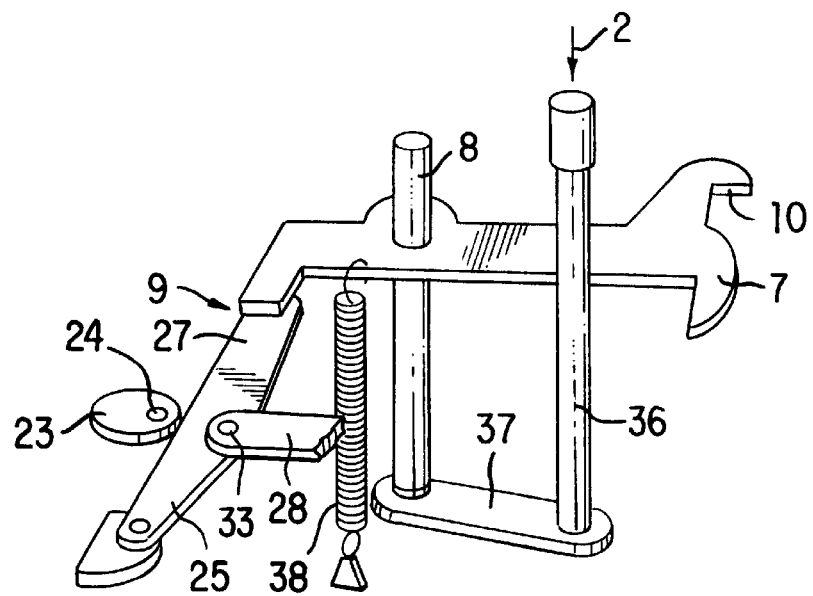
FIG. 2 shows a modification of the first retaining latch.

FIG. 2 shows a variant for blocking and enabling the mechanically controlled shutter release. Coupled to the camera release button is a rod 36 at whose lower end a retaining plate 37 is fastened. The rotational spindle 8 of the first retaining latch 7, which rotational spindle is mounted in a longitudinally displaceable manner in this exemplary embodiment, rests in a frictional manner on the retaining plate 37 under the action of a tension spring 38. The rotational spindle is connected fixedly to the retaining latch 7.

In the illustrated position of the eccentric 23, the control lever 27 of the adjusting lever 25 is directly in an active position with respect to the first active surface 9 of the retaining latch 7 and prevents a further downward movement of the retaining latch 7 by the tension spring 38. The articulated control lever 28 is outside its active position with respect to the retaining latch 11.

When the rod 36 is lowered under the pressure of the camera release button, the retaining plate 37, in a similar manner to the lever 21 in FIG. 1, actuates the release contact 22, with the result that the pulsed magnet 16 is supplied with power and the electronically controlled shutter release which has already been described proceeds.

After a certain rotation of the eccentric 23, the control lever 27 comes out of its active position with respect to the active surface 9 of the retaining latch 7. When the retaining plate 37 is lowered, the retaining latch 7 therefore follows, under the action of the tension spring 38, the displacement of the retaining plate 37. In the process, the latch engagement of the retaining latch 7 with respect to the curtain latch 3 is displaced in the vertical direction and finally enables release of the latter for the mechanically controlled shutter release which has already been described. The supply of power to the pulsed magnets 16, 19 is interrupted in the process by the switch 39 which is coupled to the eccentric 23.

Figure 3:
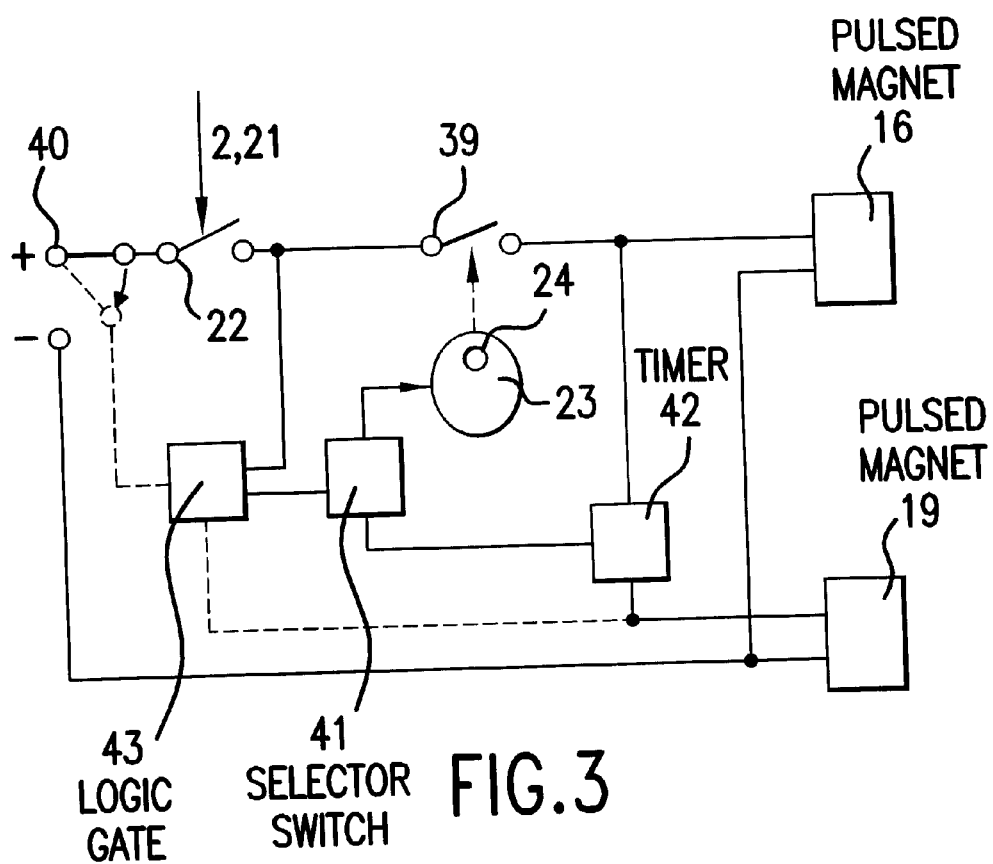
FIG. 3 shows a block diagram of the shutter release.

From the block diagram illustrated in FIG. 3 the power supply in the case of an electronically controlled and mechanically controlled shutter release can be seen. The power supply to the camera is switched on by an on/off switch 40. First of all, the release contact 22 is opened. The eccentric 23 is brought via a mode selector switch 41 into a position which corresponds to the electronically controlled shutter release according to FIG. 1. The switch 39 is therefore closed, with the result that when the camera release button is actuated in the arrow direction 2, the release contact 22 is closed via the lever 21. As a result, a voltage pulse passes to the pulsed magnet 16 and causes the drop (already described) of its armature lever. At the same time, the release pulse also passes to a timer 42 which, with a preselected or automatically formed exposure time, passes on the release pulse to the second pulsed magnet 19 which then also discharges its armature lever. Typical exposure times range from 8 s to 0,5 ms.

The on/off switch 40 is assigned a second switch position (illustrated by dashed lines) which has to be passed through prior to the power supply being disconnected. In this switch position, a release pulse is passed on via a logic gate 43 and past the timer mechanism 42 to the second pulsed magnet 19 if beforehand a signal for the selection of the electronically controlled shutter release has been passed to the logic gate 43 by the mode selector switch 41 and a signal for the movement of the first shutter curtain has been passed on to the logic gate 43 via the release contact 22. It is thereby ensured that the pulsed magnet 19 also discharges its armature lever prior to a final disconnection of the power and therefore also releases the movement of the second shutter curtain. Since, in the inoperative position of the camera, the second shutter curtain closes the plane of the film, faulty exposure of a film lying in the plane of the film is prevented.

Figure 4:
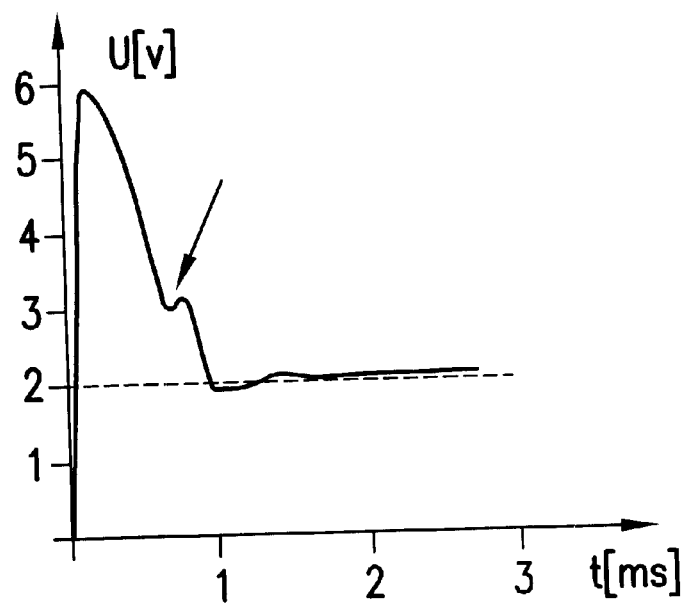
FIG. 4 shows a level profile for the activation of the pulsed magnets.

FIG. 4 illustrates the voltage profile of the release pulse for the pulsed magnets 16, 19. The design-specific discharging current at which the permanent magnetic forces are overcome is intended to be achieved at a voltage level of 2 V, for example. On account of existing inductances, the associated current can build up only with an asymptotic time profile after approximately 2–3 ms with respect to the voltage level illustrated by dashed lines. A temporally exactly controlled discharge of the armature lever is therefore not possible. Therefore, a voltage pulse rising steeply in approximately 0.1 ms and with a peak of approximately 6 V is passed on to the pulsed magnets. This voltage pulse then drops within approximately 1 ms to the accepted discharging value of 2 V. The armature is ejected at the voltage value indicated by the arrow, i.e. after approximately 0.7 ms. This relief of the load on the pulsed magnet leads on account of the inductances once again to a short rise in voltage before the design-specific voltage value of 2 V is taken up at which an unintentional lifting up of the armature lever is reliably suppressed. Surprisingly, damage to the pulsed magnet due to the high peak pulse which was not envisaged per se could not be observed. Typical peak voltages are 2 or 3 times the discharge voltage.

The illustrated input of the current/voltage into the pulsed magnets 16, 19 can be set, for example, via a current-measuring OP amplifier or via the proportionality between the gate voltage and source-drain current of a MOS-FET.

The reproducibility of the time for the discharge of the armature lever lies within the scope of the tolerances required for the accuracy of the setting of the exposure. Two pulsed magnets having coinciding discharging characteristics are advantageously combined with each other, said pulsed magnets thus having the same time delay between the beginning of the release pulse and the actual discharging of the armature lever. The time delay then has no influence on the preselected exposure time, with the result that very short exposure times, in particular, can be achieved with great accuracy.

In addition to the selective setting of a purely mechanically controlled and a purely electronically controlled shutter release, a mixed form is also possible. In the chain of action illustrated in FIG. 1, the pulsed magnet 16 can be omitted together with its armature lever 15, and the unlatching lever 30 can be arranged in a continuous active position with respect to the first retaining latch 7 by means of a guide which is independent of the adjusting lever 25. All remaining functional parts can remain unchanged. However, for the electronically controlled release of the second shutter curtain a signal transmitter for the starting of the first shutter curtain, which is only released mechanically, then has to be provided. This may, for example, be an electric switch which is enabled following movement of the shutter curtain or a light barrier through which the shutter curtain passes. The starting signal produced in this manner is passed onto the timer mechanism 42 and releases the pulsed magnet 19 in the described manner.

For reasons of space or the necessity of changes in the direction of movement, it may be required to attach further intermediate levers or other linkage elements to the active surfaces described. The basic operation of the selectively settable mechanically or electronically controlled shutter release is not influenced thereby. In addition, springs can be provided in a manner known per se in the rotational spindles for the purpose of supporting the pivotable levers and for resetting the latch connections when the shutter is reset. The rotational region of the armature levers 15, 18 is expediently limited in such a manner that during setting of the shutter said armature levers can be carried along by the retaining latches 7, 11, which fall back due to spring tension, and pass into the attraction region of the permanent magnetic forces of the pulsed magnets 16, 19. However, the resetting forces to be applied in the process by the retaining latches 7, 11 have to be relatively large.

It is therefore more expedient to bring about the resetting of the armature levers 15, 18 via separate spring-storage systems (not illustrated in greater detail) and lever mechanisms which are tensioned at the same time by the setting of the shutter. These spring-storage systems can be released by the second curtain latch 4, for example at the end of the movement thereof, and the armature levers 15, 18 can be brought back into their starting position via a simple lever mechanism. The advantage of this arrangement resides in the fact that even when the camera shutter is not tensioned the pulsed magnets are always closed. Soiling of the magnetic contacts is therefore avoided.

If, in contrast, the armature levers 15, 18 are, with the re-setting of the shutter, only positioned by actuation of special positioning levers coupled to the shutter, then care should be taken, on the one hand, to achieve a secure bearing of the armature levers and, on the other hand, that the positioning pressure exerted via the setting is not so great that the pulsed magnets are detached from their anchoring. In the case of form-fitting positioning, for example via a cam-controlled positioning lever, this protection can be achieved by the interconnection of "excessive lifting springs" which absorb the positioning pressure in the event of the positioning lever possibly being lifted too far. In the case of frictional positioning, the cam-controlled positioning lever can be provided with a spring-storage system and can simultaneously be used, for example, for the positioning of both armature levers. When the camera is tensioned, the cam serves to enable the spring-tensioned positioning lever. The latter then first of all positions one of the two armature levers, likewise via an interconnected excessive lifting spring, but then continues to move and only comes to a standstill when the second armature lever is positioned. The interconnected spring element compensates here for the difference in lift between the positioning of the first and second armature lever.

The invention is not limited to the examples of the invention described above. Modifications and variations of the invention will occur to those skilled in the field, after receiving the above teachings. Accordingly, the invention is defined with reference to the following claims.

List of Reference Numbers

1 Ground symbol
2 Release direction
3 First curtain latch
4 Second curtain latch
5 Rotational axis of curtain roller
6 Cam plate
7 First retaining latch
8 Spindle, first retaining latch
9 First active surface on first retaining latch
10 Second active surface on first retaining latch
11 Second retaining latch
12 Spindle, second retaining latch
13 First active surface on second retaining latch
14 Second active surface on second retaining latch
15 First armature lever
16 First pulsed magnet
17 Rotational axis of first armature lever
18 Second armature lever
19 Second pulsed magnet
20 Rotational axis of second armature lever
21 Lever
22 Release contact
23 Eccentric
24 Rotational axis, eccentric
25 Adjusting lever
26 Axis, adjusting lever
27 First control lever
28 Second control lever
29 Pin on first control lever
30 Unlatching lever
31 Impact surface on unlatching lever
32 Axis, unlatching lever
33 Articulated pin of second control lever
34 Lug of second control lever
35 Wedge-shaped region of second control lever
36 Rod
37 Retaining plate
38 Tension spring
39 Switch
40 On/off switch
41 Mode selector switch
42 Timer mechanism
43 Logic gate

What is claimed is:

1. A shutter for a photographic camera, having a first and a second pretensioned shutter curtain, comprising:

a first and a second pivotably mounted retaining latch to retain the first and the second curtain, respectively, in a tensioned state, in interaction with a first and a second curtain latch, the first retaining latch being coupled to a camera release for enabling release of the first curtain, and the second retaining latch being coupled to a release device, which is controlled as a function of release of the first curtain, to enable release of the second curtain;

wherein the first and second retaining latches each include second movement-releasing active surfaces which are selectively coupleable to a mechanically controlled curtain-release enabling assembly and an electronically controlled curtain-release enabling assembly.

2. A shutter for a photographic camera, having a first and a second pretensioned shutter curtain, comprising:

a first and a second pivotably mounted retaining latch to retain the first and the second curtain, respectively, in a tensioned state, in interaction with a first and a second curtain latch, the first retaining latch being coupled to a camera release for enabling release of the first curtain, and the second retaining latch being coupled to a release device, which is controlled as a function of release of the first curtain, to enable release of the second curtain, wherein the first and second retaining latches each include first and second movement-releasing active surfaces which are selectively coupleable to either a mechanically controlled curtain-release enabling assembly or an electronically controlled curtain-release enabling assembly, and wherein the mechanically controlled curtain-release enabling assembly contains an eccentric against which a pivotable adjusting lever bears, said adjusting lever containing a fixed, first control lever and an articulated, second control lever, rotation of the first control lever by the eccentric enabling an unlatching lever to be brought into an active position with respect to the first active surface of the first retaining latch and the second control lever to be brought into an active position with respect to the first active surface of the second remaining latch.

3. A shutter for a photographic camera, having a first and a second pretensioned shutter curtain, comprising:

a first and a second pivotably mounted retaining latch to retain the first and the second curtain, respectively, in a tensioned state, in interaction with a first and a second curtain latch, the first retaining latch being coupled to a camera release for enabling release of the first curtain, and the second retaining latch being coupled to a release device, which is controlled as a function of release of the first curtain, to enable release of the second curtain, wherein the first and second retaining latches each include first and second movement-releasing active surfaces which are selectively coupleable to either a mechanically controlled curtain-release enabling assembly or an electronically controlled curtain-release enabling assembly, and wherein, for the mechanically controlled curtain-release enabling assembly, the first retaining latch is displaceable in a direction around its pivot spindle and an eccentric is provided against which a pivotable adjusting lever bears, said adjusting lever including a fixed, first control lever and an articulated, second control lever, rotation of the eccentric enabling the first control lever to be brought out of a position contacting a first active surface of the first retaining latch, which position blocks displacement of the first retaining latch and enabling the second control lever to be brought into an active position with respect to the first active surface of the second retaining latch.

4. The shutter as claimed in claim 2, wherein a time delay for action upon the second retaining latch is set via the rotation of the eccentric.

5. The shutter as claimed in claim 4, wherein the first curtain latch includes a cam which, after release of the first curtain, acts upon an active position of the second control lever to enable release of the second curtain.

6. The shutter as claimed in claim 2, further comprising
a mode selector switch coupled to the eccentric to select mechanical or electronic setting of exposure time; and
a switch in a power-supply line for electronic setting of the exposure time which opens when mechanically controlled setting of the exposure time is selected.

7. The shutter as claimed in claim 1, further comprising a first and a second pulsed magnet with a first and a second armature lever, respectively, said armature levers each being arranged in an active position with respect to an active surface of a retaining latch.

8. The shutter as claimed in claim 7, further comprising
an electronic switch coupled to the camera release via which a temporary supply of power to the first pulsed magnet is provided and a supply of power to the second pulsed magnet is provided in a temporally delayed manner via a timer, and
wherein respective armature levers can be brought to a stop against active surfaces of the first and second retaining latches.

9. The shutter as claimed in claim 8, further comprising a power supply which provides power having a level profile which begins with a steeply rising signal level which lies clearly above a discharge voltage of the first and second pulsed magnets and then drops rapidly to the discharge voltage.

10. The shutter as claimed in claim 8, further comprising an on/off switch which, prior to a disconnection of power and in interaction with a logic gate, supplies power to the second pulsed magnet irrespective of a time delay of the timer after power has already been supplied to the first pulsed magnet.

11. The shutter as claimed in claim 1, wherein the shutter curtains include a rolling screen.

* * * * *